R. ROMADKA.
CAR WHEEL.
APPLICATION FILED NOV. 2, 1918.
1,350,738.
Patented Aug. 24, 1920.
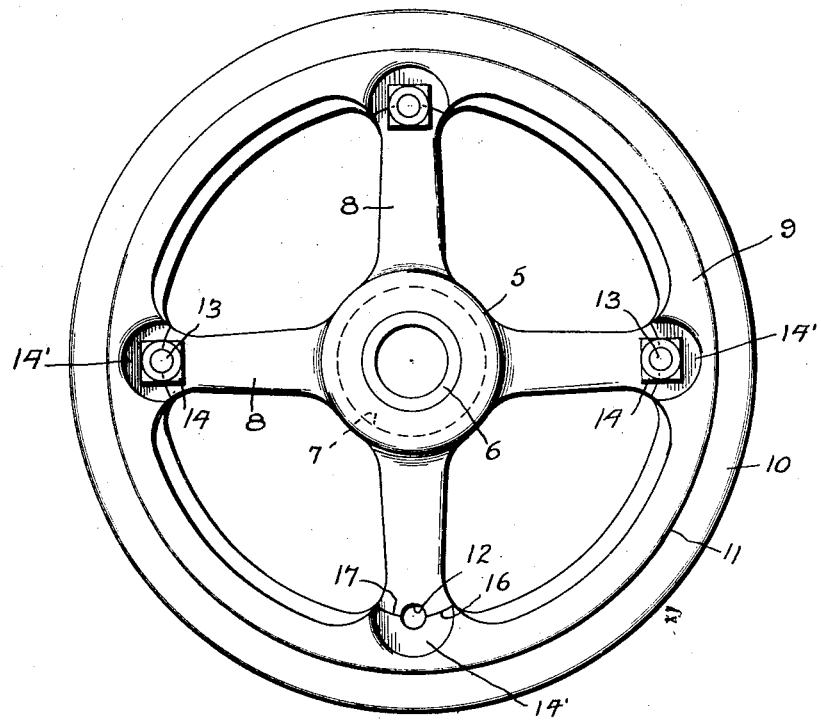
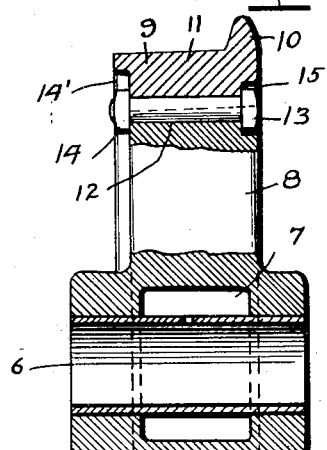
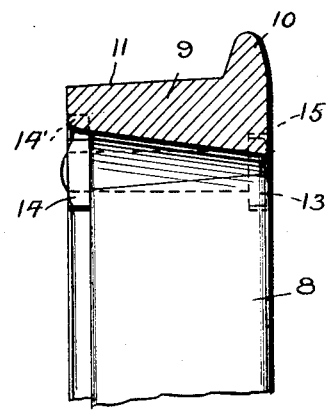
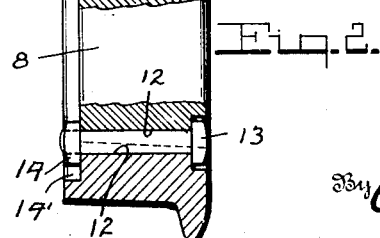
Inventor
R. Romadka

UNITED STATES PATENT OFFICE.

RUDOLPH ROMADKA, OF MILWAUKEE, WISCONSIN.

CAR-WHEEL.

1,350,738.  Specification of Letters Patent.  Patented Aug. 24, 1920.

Application filed November 2, 1918. Serial No. 260,864.

*To all whom it may concern:*

Be it known that I, RUDOLPH ROMADKA, a citizen of Austria, residing at Milwaukee, in the county of Milwaukee and State of Wisconsin, have invented certain new and useful Improvements in Car-Wheels; and I do hereby declare the following to be a full, clear, and exact description of the invention, such as will enable others skilled in the art to which it appertains to make and use the same.

My invention relates to improvements in car wheels having detachable rims.

An important object of this invention is to provide a car wheel of the character described, having means for quickly and conveniently replacing the rim, when the same becomes worn or cracked as the result of contraction, during cold weather.

A further object of the invention is to provide a wheel of the character described wherein the detachable rim may be rigidly and securely locked in position by a plurality of bolts.

A further object of the invention is to provide a wheel of the character described, which is of highly simplified construction, reliable and durable in use.

Other objects and advantages of the invention will be apparent during the course of the following description.

In the accompanying drawings forming a part of this specification and in which like numerals are employed to designate like parts throughout the same, Figure 1 is a side elevation of a wheel embodied in my invention, Fig. 2 is a vertical central transverse section through the same, and Fig. 3 is an enlarged fragmentary sectional view through the same.

In the drawings wherein for the purpose of illustration is shown the preferred embodiment of my invention, the numeral 5 designates the hub of a wheel, having a detachable axle bushing 6 arranged therein and is surrounded by a suitable oil box 7.

Spokes 8 are formed integral with the hub and radiate therefrom. A rim 9 is detachably secured to the spokes 8 and is provided with the usual traction flange 10 and tread surface 11. The outer ends of the spokes 8 and the adjacent portion of the rim 9 are provided with alining semi-circular recesses 12. The recesses 12 are adapted for the reception of bolts 13 having screw threaded engagement with nuts 14. The outer portion of the rim 9 which surrounds the semi-circular recess in the ends of the spokes is provided with a cut-out portion 14 for the reception of the heads of the bolts 13. The opposite sides of the rim, as shown in Fig. 2, are also provided with recesses 15 adapted for the reception of the nuts 14.

The rim 9 is adapted to be inserted over the spokes 8 from the outer side thereof and is provided with enlarged shoulders 16. As clearly shown in Fig 2, the shoulders 16 are curved transversely and inclined longitudinally and are adapted to interlock with the enlarged heads 17 formed on the outer ends of the spokes 8. The heads 17 are also curved transversely and inclined and are thus held in rigid engagement with the rim 9.

In applying my detachable rim to the spokes, it will be apparent that the same is slipped over the spokes from the outer side and secured thereto by the bolts 13.

While I have shown and described the preferred embodiment of my invention, it is understood that I may make such minor changes in arrangement and construction of parts, as will remain within the spirit of the invention and the scope of the appended claims.

Having thus described my invention, what I claim is:—

1. A wheel of the character described comprising, a hub; spokes radiating from said hub; a rim adapted to be arranged over said spokes and having transversely extending semi-circular recesses in its inner surface; shoulders formed on the opposite sides of said semi-circular recesses, said shoulders being inclined longitudinally and curved transversely; enlarged heads formed on the outer ends of said spokes being adapted to interlock with said shoulders, said heads having semi-circular recesses formed therein and alining with the semi-circular recesses of said rim; and bolts adapted to extend through said recesses.

2. A wheel of the character described comprising, a hub; spokes radiating from said hub and formed integral therewith; a rim adapted to be arranged over said spokes, said rim having semi-circular recesses traversing its inner surface; longitudinally inclined shoulders formed on the inner side of said rim and on opposite sides of said semi-circular recesses; enlarged heads formed on the outer ends of said spokes and engaging said inclined shoulders, said spokes having semi-circular recesses disposed between said enlarged heads, said semi-circular recesses alining with the semi-circular recesses of said rim, thus forming cylindrical openings; and bolts adapted to extend through said cylindrical openings to secure the rim to the spokes.

3. A car wheel of the character described comprising, a hub; spokes radiating from said hub; a rim adapted to be arranged over said spokes, said rim having semi-circular recesses traversing its inner surface; transversely curved shoulders formed on said rim on opposite sides of said semi-circular recesses; transversely curved heads formed on the outer ends of said spokes and adapted to engage said transversely curved shoulders, said spokes having semi-circular recesses on their outer ends and alining with said semi-circular recesses of said rim; and bolts adapted to extend through said alining recesses.

In testimony whereof I affix my signature in presence of two witnesses.

RUDOLPH ROMADKA.

Witnesses:
H. S. FREIHUBE,
W. J. FREIHUBE.